(12) United States Patent
Carey

(10) Patent No.: US 11,214,486 B2
(45) Date of Patent: *Jan. 4, 2022

(54) DESALINATION METHODS AND DEVICES USING GEOTHERMAL ENERGY

(71) Applicant: Marine Power Products Incorporated, Pullman, WA (US)

(72) Inventor: Jeffrey M. Carey, Pullman, WA (US)

(73) Assignee: Marine Power Products Incorporated, Pullman, WA (US)

( * ) Notice: Subject to any disclaimer, the term of this patent is extended or adjusted under 35 U.S.C. 154(b) by 531 days.

This patent is subject to a terminal disclaimer.

(21) Appl. No.: 16/162,562

(22) Filed: Oct. 17, 2018

(65) Prior Publication Data

US 2019/0047854 A1    Feb. 14, 2019

Related U.S. Application Data

(60) Continuation-in-part of application No. 14/095,765, filed on Dec. 3, 2013, now Pat. No. 10,145,015, and
(Continued)

(51) Int. Cl.
*C25B 1/04* (2021.01)
*C01B 3/04* (2006.01)
(Continued)

(52) U.S. Cl.
CPC .............. *C01B 3/042* (2013.01); *B01J 7/02* (2013.01); *B01J 21/02* (2013.01); *B01J 23/50* (2013.01);
(Continued)

(58) Field of Classification Search
CPC .. C01B 3/042; C01B 3/02; C01B 5/00; C25B 1/04; Y02E 60/36; Y02E 10/10; Y02E 60/366; Y02E 70/10; Y02P 20/129
See application file for complete search history.

(56) References Cited

U.S. PATENT DOCUMENTS 3,892,653 A    7/1975   Pacheco
3,954,592 A    5/1976   Horvath
(Continued)

FOREIGN PATENT DOCUMENTS

EP    1249052 B1    4/2009
EP    2360230 A1    8/2011
(Continued)

OTHER PUBLICATIONS

"Bayer process", hhtp://en.wikipedia.org/wiki/Bayer_proces, pp. 1-2.
(Continued)

*Primary Examiner* — Lorne E Meade
(74) *Attorney, Agent, or Firm* — Haverstock & Owens LLP

(57) ABSTRACT

A method of and apparatus for desalinating sea water using geothermal energy. A low voltage (such as less than 0.9V) is applied to a hydrogen generating catalysts to generate hydrogen and oxygen, wherein geothermal heat is used as a heat source. The hydrogen and oxygen are used to drive a gas turbine to generate electricity. The oxygen and hydrogen are transported away and combusted to generate heat and pure water, as such salt are separated from the pure water.

10 Claims, 3 Drawing Sheets

Related U.S. Application Data a continuation-in-part of application No. 15/204,609, filed on Jul. 7, 2016, now Pat. No. 10,118,821, which is a division of application No. 12/706,639, filed on Feb. 16, 2010, now Pat. No. 9,415,363.

(60) Provisional application No. 61/733,868, filed on Dec. 5, 2012, provisional application No. 61/154,282, filed on Feb. 20, 2009.

(51) Int. Cl.

| | |
|---|---|
| *C25B 15/08* | (2006.01) |
| *C25B 15/02* | (2021.01) |
| *B01J 38/48* | (2006.01) |
| *B01J 23/72* | (2006.01) |
| *B01J 23/50* | (2006.01) |
| *B01J 21/02* | (2006.01) |
| *C01B 13/02* | (2006.01) |
| *B01J 7/02* | (2006.01) |
| *B01J 23/89* | (2006.01) |
| *C25B 11/075* | (2021.01) |

(52) U.S. Cl.
CPC ............ *B01J 23/72* (2013.01); *B01J 23/8926* (2013.01); *B01J 38/48* (2013.01); *C01B 3/04* (2013.01); *C01B 13/0203* (2013.01); *C01B 13/0207* (2013.01); *C25B 1/04* (2013.01); *C25B 11/075* (2021.01); *C25B 15/02* (2013.01); *C25B 15/08* (2013.01); *B01J 2219/00006* (2013.01); *B01J 2219/00144* (2013.01); *Y02E 60/36* (2013.01); *Y02P 20/129* (2015.11)

(56) References Cited

U.S. PATENT DOCUMENTS

| | | | |
|---|---|---|---|
| 4,004,067 A | 1/1977 | Briggs et al. | |
| 4,144,147 A | 3/1979 | Jarrett et al. | |
| 4,358,291 A | 11/1982 | Cuomo et al. | |
| 4,394,293 A | 7/1983 | Gratzel et al. | |
| 4,406,118 A * | 9/1983 | Funk ................... | C10J 3/06 60/39.183 |
| 4,454,427 A | 6/1984 | Sonowoski et al. | |
| 5,219,671 A | 6/1993 | Parker et al. | |
| 5,796,799 A | 8/1998 | Kobayashi et al. | |
| 6,306,917 B1 | 10/2001 | Bohn et al. | |
| 6,843,903 B2 | 1/2005 | Roe et al. | |
| 6,991,719 B2 | 1/2006 | Ovshinsky | |
| 7,125,480 B2 | 10/2006 | Austin | |
| 7,178,339 B2 | 2/2007 | Golmeer et al. | |
| 7,252,806 B1 | 8/2007 | Merritt | |
| 7,875,166 B2 | 8/2011 | Matthai et al. | |
| 7,989,507 B2 | 8/2011 | Rising | |
| 2001/0046113 A1 | 11/2001 | Schmidt | |
| 2002/0048548 A1 | 4/2002 | Chaklader | |
| 2002/0155330 A1 | 10/2002 | Tanaka | |
| 2004/0031697 A1 | 2/2004 | Breault | |
| 2004/0265678 A1 | 12/2004 | Hommura et al. | |
| 2005/0051439 A1 | 3/2005 | Jang | |
| 2005/0269211 A1 | 12/2005 | Zachar | |
| 2006/0102468 A1 | 6/2006 | Monzyk et al. | |
| 2006/0118428 A1 | 6/2006 | Baitruck et al. | |
| 2006/0180464 A1 | 8/2006 | Griffin | |
| 2006/0188436 A1 | 8/2006 | Griffin | |
| 2006/0249393 A1 | 11/2006 | Ghosh et al. | |
| 2007/0072949 A1 | 3/2007 | Ruud et al. | |
| 2007/0244208 A1 | 10/2007 | Shulenberger et al. | |
| 2008/0163618 A1* | 7/2008 | Paul ................... | F01K 25/005 60/407 |
| 2008/0296172 A1 | 12/2008 | Davidson | |
| 2009/0074611 A1 | 3/2009 | Monzyk et al. | |
| 2009/0110976 A1 | 4/2009 | Yoshida et al. | |
| 2009/0101520 A1 | 5/2009 | Zhang et al. | |
| 2009/0115190 A1 | 5/2009 | Devine | |
| 2009/0152126 A1 | 6/2009 | Griffin | |
| 2009/0277799 A1 | 11/2009 | Grimes | |
| 2010/0000874 A1 | 1/2010 | Hinman et al. | |
| 2010/0004495 A1 | 1/2010 | Fareid et al. | |
| 2010/0005809 A1 | 1/2010 | Anderson | |
| 2010/0133111 A1 | 9/2010 | Nocera et al. | |
| 2010/0224502 A1 | 9/2010 | Carey | |
| 2010/0270170 A1* | 10/2010 | Rosenbaum ........ | C02F 1/46104 205/742 |
| 2011/0041740 A1 | 2/2011 | Reilly | |
| 2011/0114075 A1 | 5/2011 | Mills | |
| 2013/0259798 A1 | 10/2013 | Carey | |
| 2013/0277231 A1 | 10/2013 | Greenberg | |
| 2013/0281553 A1 | 10/2013 | Kubic et al. | |
| 2016/0068971 A1 | 3/2016 | Phillips | |

FOREIGN PATENT DOCUMENTS

| | | |
|---|---|---|
| GB | 2461723 A | 1/2010 |
| WO | 8910981 | 11/1989 |
| WO | 2010084358 A2 | 7/2010 |
| WO | 2011002527 A1 | 1/2011 |
| WO | 2012062529 A1 | 5/2012 |

OTHER PUBLICATIONS

Currao et al., Water Splitting with Silver Chloride Photoanodes and Amorphous Silicon solar Cells. Photochemical and Photobiological Sciences, vol. 3, 2004, [retrieved on Nov. 19, 2013], Retrieved from the Internet. <URL: http://www.gioncalzaferri.ch/publikationen/Photochem_Photobiol_Sci_2004_3_1017%20Watersplitting.pdf>. entire document.

David R. Lide et al., "CRC Handbook of Chemistry and Physics 76th Eddition", New York 1195-1996, p. 8-58.

Frederick Lowenheim, "Electroplating", McGraw-Hill Book Company, New York 1979, p. 12-25.

Kim, MingJoong et al., "Hydrogen generation from hydrolysis reaction through corrosion of Al—Cu alloy in alkaline water", Dep. of Materail Science and Engineering.

Perret, Robert, "II.F.1 Develpment of Solar-Powered Thermochemical Production of Hydrogen from Water", DOE Hydrogen Program, FY 2007 Annual Progress Report, pp. 128-135.

Peters, W.G., "Colloidal Silver Chemistry", http://www.wgpeters.com//colloidal-silver-chemistry//, pp. 1-3.

Soler, Lluis et al., "Aluminum and aluminum alloys as sources of hydrogen for fuel cell applications", Journal of Power Sources,2007, www.sciencedirect.com,www.elsevier.com/locate/jpowsour, pp. 144-149.

Venere,Emil, "New Process Generates Hydrogen From Aluminum Alloy To Run Engines, Fuel Cells", Purdue University, http://news.uns.purdue.edu/x/2007a/070515WoodallHydrogen.html, May 15, 2007.

"The Jet Engine" Third Edition, Rolls-Royce Limited, 1969, pp. 9-14.

Kanoglu et al., "Thermodynamic Analysis of Models used in Hydrogen Production by Geothermal Energy", International Journal of Hydrogen Energy, vol. 35, 2010, pp. 8783-8791.

Hand, Theodore W., "Hydrogen Production Using Geothermal Energy" (2008), All Graduate Theses and Dissertations, Paper 39, accessed at http://digitalcommons,usu.edu/etd/39 on Apr. 16, 2016.

* cited by examiner

DESALINATION METHODS AND DEVICES USING GEOTHERMAL ENERGY

CROSS-REFERENCE TO RELATED APPLICATIONS

This application is a continuation-in-part of U.S. patent application Ser. No. 14/095,765, filed Dec. 3, 2013, and entitled "Hydrogen Generating System and Method Using Geothermal Energy," which claims priority of U.S. Provisional Application, Ser. No. 61/733,868, filed Dec. 5, 2012 and titled, "Hydrogen Generating System and Method Using Geothermal Energy," which are hereby incorporated by reference in their entirety for all purposes.

Additionally, this application is a continuation-in-part of U.S. patent application Ser. No. 15/204,609, filed Nov. 3, 2016, and entitled "METHOD AND APPARATUS FOR EFFICIENT ON-DEMAND PRODUCTION OF $H_2$ AND $O_2$ FROM WATER USING WASTE HEAT AND ENVIRONMENTALLY SAFE METALS," which is a divisional application of U.S. patent application Ser. No. 12/706,639, filed Feb. 16, 2010, issued as U.S. Pat. No. 9,415,363, and entitled "METHOD AND APPARATUS FOR EFFICIENT ON-DEMAND PRODUCTION OF $H_2$ AND $O_2$ FROM WATER USING WASTE HEAT AND ENVIRONMENTALLY SAFE METALS," which claims priority of U.S. Provisional Application, Ser. No. 61/154,282, filed Feb. 20, 2009 and titled, "METHOD AND APPARATUS FOR EFFICIENT ON-DEMAND PRODUCTION OF H2 AND O2 FROM WATER USING ENVIRONMENTALLY SAFE METALS," which are hereby incorporated by reference in their entirety for all purposes.

FIELD OF THE INVENTION

The present invention relates to hydrogen and oxygen production. More specifically, the present invention relates to hydrogen and oxygen production using geothermal heat, water, and an environmentally safe catalyst.

BACKGROUND OF THE INVENTION

Typical methods and devices for desalinating sea/salt water require much energy to push the salt water through an ion exchange membrane. Distillation of salt water is inefficient in terms of its energy use. More energy efficient methods and device for desalination are needed.

SUMMARY OF THE INVENTION

Methods of and apparatuses for producing $H_2$ and $O_2$ from salt water using geothermal heat are disclosed. In one aspect, the apparatus comprises a main reactor, a gas turbine, and a source of geothermal heat.

In one aspect, a method of desalination comprising applying a voltage to a solution containing sodium chloride and a hydrogen producing catalyst, generating an amount of hydrogen with the hydrogen producing catalyst, and generating an amount of pure water by combusting the amount of hydrogen and oxygen. In some embodiments, the method further comprises providing geothermal heat. In other embodiments, the voltage is equal or less than 1V. In some other embodiments, the solution comprises water having salt. In some embodiments, the solution comprises sea water. In some other embodiments, the hydrogen producing catalyst contains aluminum, silver, and copper. In some embodiments, the oxygen is generated by the hydrogen producing catalyst. In other embodiments, the method further comprises driving an electricity generating turbine using the hydrogen generated.

In another aspect, a hydrogen producing system comprises a non-acidic solution containing a hydrogen generating catalyst, wherein the hydrogen generating catalyst contains a charge-treated aluminum metal, a charge-treated copper metal, and a charged-treated silver metal, wherein the charge-treated aluminum, copper, and silver metals are treated by a voltage not less than 1V, and wherein the hydrogen generating catalyst is capable of generating hydrogen gas in a catalytic manner with an applied voltage no greater than 1V, an electric energy providing device, and a geothermal heating device providing heat to the non-acidic solution.

In some embodiments, the system comprises a light source. In other embodiments, the light source comprises LED. In some other embodiments, the light source provides lights having wavelengths approximately in the visible light region. In some embodiments, the geothermal heating device receives a amount of geothermal heat from the earth. In other embodiments, the hydrogen generating catalyst comprises aluminum hydroxide. In some other embodiments, the hydrogen generating catalyst comprises copper hydroxide. In some embodiments, the hydrogen generating catalyst comprises silver hydroxide. In other embodiments, the system further comprises a computer automating a transportation of the non-acidic solution.

In another aspect, a method of generating electricity comprises applying a voltage less than 1V to a solution having a catalyst, wherein the catalysts containing aluminum complex, copper complex, and silver complex, and providing heat from a geothermal heat source to the solution. In some embodiments, the solution is a non-acidic solution. In other embodiments, the solution has a pH value equal or great than 7. In some other embodiments, the method further comprises turning a turbine to generate electricity by using one or more gases that are generated at the solution. In some embodiments, the method further comprises using the electricity generated as an energy source to be applied to the solution. In other embodiments, the one or more gases comprise hydrogen, oxygen, or a combination thereof. In some other embodiments, the method further comprises combusting the hydrogen and oxygen to generate heat and water.

In some embodiments, the method further comprises transporting the heat and the water to add to the solution.

In another aspect, a hydrogen generating method comprises generating hydrogen gas and oxygen gas by applying a pulsed voltage less than 1V to a solution, wherein the solution containing a catalyst having aluminum, copper, and silver, and heating the solution by a geothermal heat and a heat generated by combusting the hydrogen gas and the oxygen gas.

In some embodiments, the method further comprises regenerating the catalyst by providing an amount of light. In other embodiments, the light comprises LED.

DETAILED DESCRIPTION OF THE PREFERRED EMBODIMENT

Figure 1:
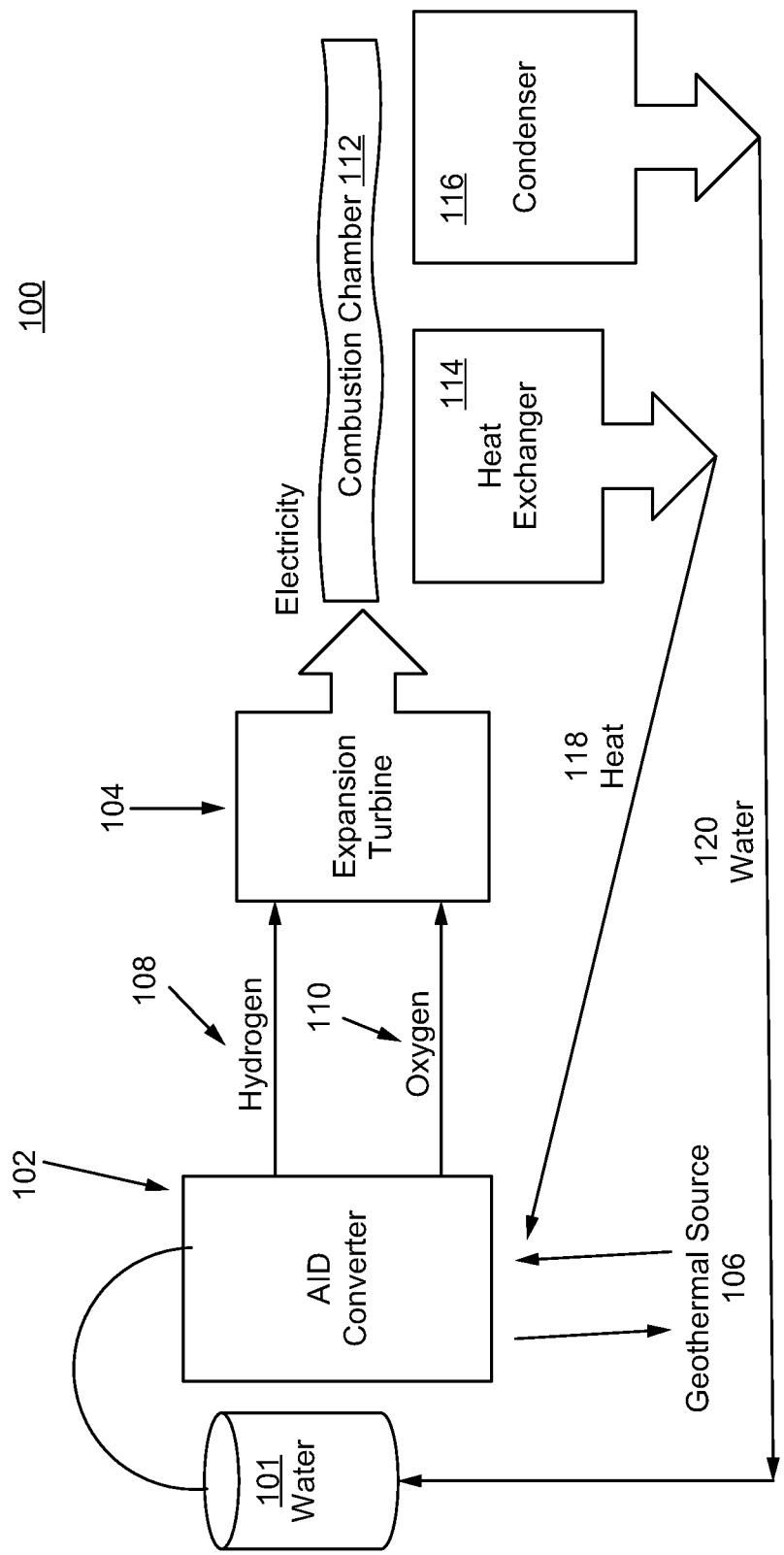
FIG. 1 illustrates a hydrogen producing system in accordance with some embodiments.

FIG. 1 illustrates a hydrogen producing system 100 in accordance with some embodiments. The hydrogen producing system 100 is able to use geothermal heat as the heat source for chemical reactions. In some embodiments, the hydrogen producing system 100 comprises a reactor 102. The reactor 102 allows an active ion displacement reaction to occur. In some embodiments, the chemical reactions in the reactor 102 generate hydrogen gas and oxygen gas. Details of the compositions, starting materials, and catalysts that are used in the reactor 102 are described in the following. In some embodiments, the hydrogen gas producing reaction occurs in the reactor 102. A heat source 106, such as a geothermal source, having heat to be provided to the reactor 102. The geothermal source is able to provide/supply heat to the reactor 102. The geothermal heat is able to be pre-stored before providing heat to the reactor 102. A person of ordinary skill in the art appreciates that any other sources of heat from nature are within the scope of the present invention. The water source of the reaction is able to be from the water tank 101. The hydrogen producing reaction in the reactor 102 generates hydrogen gas 108 and oxygen gas 110. The hydrogen gas 108 and oxygen gas 110 are sent to drive a expansion turbine 104 to generate electricity by using the gas pressure/gas flow generated at the hydrogen producing reaction. The hydrogen gas 108 and the oxygen gas 110, after passing through the expansion turbine 104, are triggered to be combusted/reacted at a combustion chamber 112. The hydrogen gas is able to react with the oxygen gas by using electric sparks. Heat that is generated through reacting hydrogen gas 108 and the oxygen gas 110 is able to be transferred to a heat exchanger 114, which is able to be applied back to the reactor 102 for recycling and reusing the heat. The combustion reaction of the oxygen gas 110 and the hydrogen gas 108 produces pure water, which is able to be condensed and collected at the condenser 116, such that the system 100 is able to be used as a desalination device to produce pure water. In some embodiments, the water is able to be recycled back to the reactor 102, so no new water or external water is needed for continuously running the hydrogen producing reaction.

Figure 2:
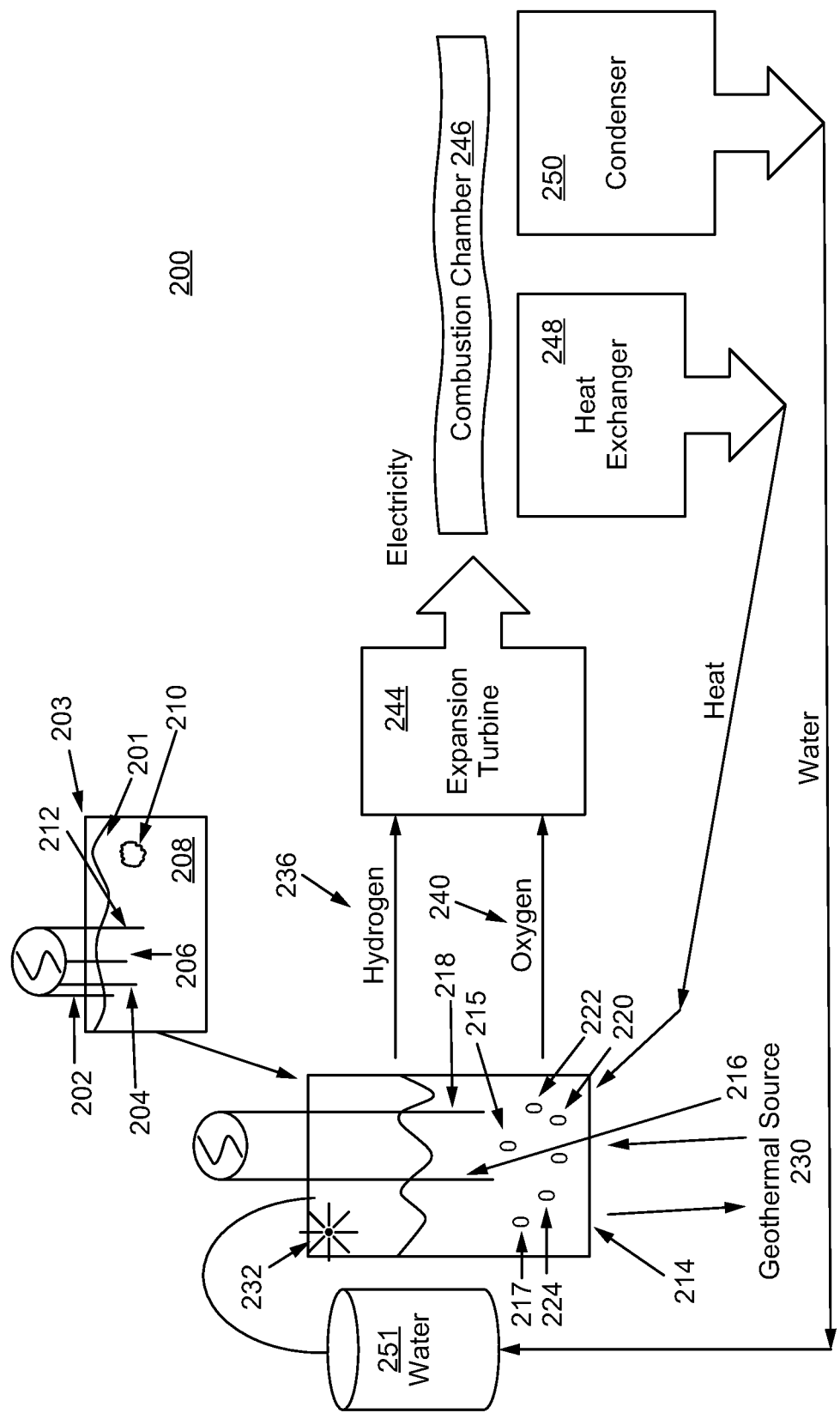
FIG. 2 illustrates another hydrogen producing system in accordance with some embodiments.

FIG. 2 illustrates a hydrogen producing system 200 in accordance with some embodiments. In some embodiments, the system 200 comprises a preparation reactor 203 and a main reactor 214. The main reactor 214 comprises a photochemical/oxidizer reacting device 232, and a thermal source 230, which is able to be a geothermal source. A hydrogen producing reaction is able to begin from preparing a solution 201 containing Al metal 202 (250 mg), Cu metal 204 (250 mg), Ag metal 206 (250 mg), a graphite electrode 212 and 1 liter of water 208 having 1.5% NaCl 210 by weight. A negative voltage −2.5V is applied to the graphite electrode 212 and a first positive voltage 1.7V is applied to the Al metal 202 for 15 minutes.

Next, the first positive voltage applied to the Al metal 202 is removed, and a second positive voltage of 1.4V is applied to the Cu metal 204 for 10 minutes while the negative voltage of −2.5V is applied to the graphite electrode 212. Next, the second positive voltage is removed from the Cu metal 204, and a third positive voltage of 1.0V is applied to the Ag metal 206 for 5 minutes with the negative voltage still applied to the graphite electrode 212. The temperature of the solution is maintained at 88° F. by controlling the heat source 230.

Next, the solution 201 is transferred to the main reaction vessel 214, so that the main reaction vessel 214 contains aluminum complex 215, copper complex 217, silver complex 220, sodium ions 222, and chloride ions 224 from the preparation vessel 203. Water is able to be input from a water tank 251. The term "complex" comprises all ligand states of a metal. For example, an aluminum complex includes $Al^{3+}$ or $Al(OH)_x$, where the x represents the coordinated ligand numbers of the aluminum ion. In some embodiments, a voltage between 0.4V and 0.9V is applied to the cathode of the electrodes. In alternative embodiments, a voltage of 0.85V is applied to the cathode of the electrodes. In other embodiments, a voltage not exceeding 0.9V is applied to the cathode of the electrodes. Some experiments indicate that hydrogen production is reduced when a voltage exceeding 0.9V is applied. In some embodiments, the applied voltage of the anode is at 0V compared with a voltage on the standard hydrogen electrode. In some embodiments, the voltage is applied in a way that a negative charge is applied to the stainless steel electrode 216 and a positive charge is applied to the graphite electrode 218. A hydrolysis reaction begins to occur when sufficient voltage is applied, and hydrogen gas 236 is generated at the stainless steel electrode 216 when the voltage is applied to the stainless steel electrode 216 and the graphite electrode 218. While the hydrogen producing reaction is going, heat is provided through the heat source 230 and lightings 232 (such as, LED lights) are applied to the main reactor 214 for assisting a photolysis reaction.

Oxygen gas 240 and hydrogen gas 236 are output to the expansion turbine 244 to generate electricity. The oxygen gas 240 and the hydrogen gas 236 are able to react at the combustion chamber 246 to generate electricity through a combustion reaction. The heat generated at the combustion chamber 246 is able to be collected at the heat exchanger 248 and the water generated is able to be collected at the condenser 250. The water collected at the condenser 250 is able to be used as pure water or recycled back to the main reactor 214. The whole reaction is able to be automatically controlled by a computer system to maintain a continuous operation of the reaction, including maintaining an optimized reaction condition for the hydrogen producing reaction.

Figure 3:
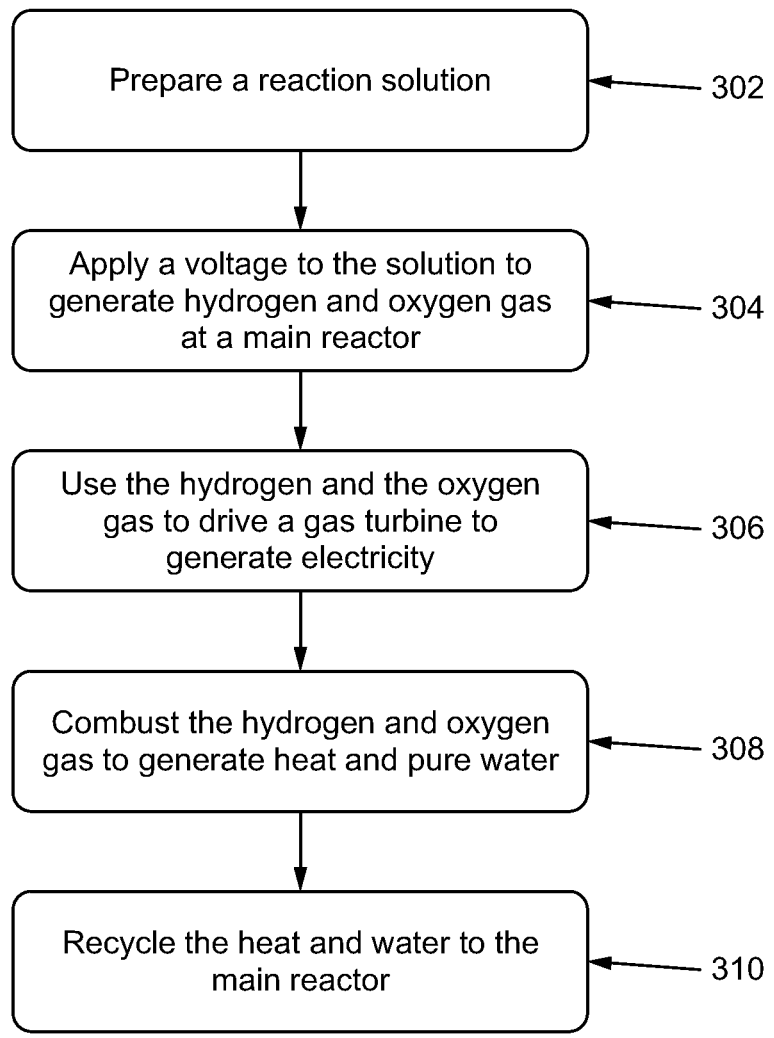
FIG. 3 is a flow chart illustrating a hydrogen producing process using geothermal as a heat source in accordance with some embodiments.

FIG. 3 is a flow chart illustrating a hydrogen producing process 300 using geothermal as a heat source. The process 300 is able to begin from preparing a reaction solution at Step 302. The solution preparation is able to be performed at the preparation reactor 203 (FIG. 2) with the procedures described above. At Step 304, voltage is applied to the solution to generate hydrogen gas and oxygen gas. At Step 306, the hydrogen gas and the oxygen gas are sent to a gas turbine to generate electricity. At Step 308, the hydrogen gas and the oxygen gas are combusted to generate heat and pure water. At Step 310, the heat and water is recycled back to the main reactor for running the reaction. All the steps that are contained in the methods/procedures described above are some embodiments of the present application. All the steps are optional and all the steps when applicable are able to be performed in any sequences or orders. Additional steps are also able to be added when a person skilled in the art deems proper.

Geothermal Heat Storing and/or Desalination Devices and Systems

In some embodiments, the systems and methods use the hydrogen and/or oxygen as an intermediate energy storage device. In other words, it can be used as a device or method for storing heat from a geothermal source. Heat in general is a type of energy that is more difficult to store than storing energy in a form of gases, which are more stable and storable when compared with heat. Here, the hydrogen and oxygen gases are able to be generated using thermal energy, which are used to drive one or more gas turbines via gas flow or pressure difference to generate electricity. Next, the hydrogen and oxygen are combusted to release their potential energy and make water. Since hydrogen and oxygen are generated and consumed without additional gases generated or consumed, the hydrogen and oxygen are able to be used as a form of energy storage.

Additionally, the systems and devices are used as a desalination device or method, wherein a geothermal heat is used to perform the process. Since the unique property of the hydrogen generating catalysts (e.g., an aluminum complex, a copper complex, and a silver complex), a low temperature (e.g., below 40° C.) is used to perform the hydrogen generating reaction. In some embodiments, the low temperature (e.g., below 40° C.) is used for the entire reaction, including the catalysts preparation and hydrogen generating catalysts regeneration reaction. In some embodiments, 31° C. is the temperature that is used for generating the hydrogen gas. In some embodiments, an amount of sea water is used as a source of the water supply. By using the desalination methods and devices described herein, salts that are contained in the sea water are left at the main reactor and pure water is generated by combining and combusting the hydrogen and oxygen gases generated. A regular cleaning or removal of the salts at the reactor where the salts are left is performed (e.g., once a day, once a week, or any other predetermined duration). As described above, the methods and devices disclosed herein are configured to generate hydrogen/oxygen gases, serve as a desalination device, and/or a geothermal storage using an amount of the geothermal heat, sea water, or a combination thereof.

In one of the exemplary cases as illustrated by the FIG. 2, a main reactor 214 is coupled with or located at or near a source of the geothermal heat 230. In some embodiments, the main reactor 214 is a geothermal power plant. An amount of the geothermal heat 230 is conducted via one or more thermal paths, such as by direct contact, to be transferred to the main reactor 214, such as a wall or a bottom surface of a reactor. In some embodiments, a continuous supply of the geothermal heat 230 is provided to the main reactor 214.

In the reactor, one or more of the light sources 232 (e.g., LED light) are in the main reactor 214, so that a regeneration reaction of the hydrogen generating catalysts can be performed inside the main reactor 214. In some embodiments, the light sources 232 are included in a separate chamber, reactor, or container, so that the regeneration of the hydrogen generating reaction can be performed in a regeneration reactor that is separated or independent from the solution of the main reactor 214. In some embodiments, an additional heat source, such as a heating coil heater, is used to provide heat needed for the regeneration reaction of the hydrogen generating catalysts.

In some embodiments, the preparation of the hydrogen generating catalysts is able to be followed by the description in the FIG. 2 and its accompanying text. In some embodiments, the preparation of the hydrogen generating catalysts including applying a first voltage to a graphite electrode (e.g., a voltage greater than −2.0V, such as −2.0 to −2.5V) and one or more voltages to the metal catalysts (e.g., aluminum metal, copper metal, and silver metal respectively). In some embodiments, the voltage that is applied to the metals is greater than 1V. In some embodiments, the voltage that is applied to the metals is 0.9V or greater (e.g., 0.9V-1.9V). For example, a voltage of 1.1V-1.9V, 1.7V, or 1.5-2.0V is applied to the aluminum metal. A voltage of 1.1V-1.9V, 1.4V, or 1.2-2.0V is applied to the copper metal. A voltage of 1.1V-1.9V, 1.4V, or 1.2-2.0V is applied to the silver metal.

In some embodiments, a voltage for generating hydrogen gas, oxygen gas, or both is applied to the electrodes/solution containing the hydrogen generating catalysts. In some embodiments, the voltage for generating the above mentioned gases is configured to or limited to a voltage that is equal or below 0.9V. For example, a voltage between 0.4V to 0.9V is applied to the electrodes and solutions for generating a continuous stream of hydrogen gas and oxygen gas. In some embodiments, a voltage of 0.85V is configured to be applied to the electrodes for driving the catalysts to produce the gases mentioned above.

The systems and procedures are able to be utilized to produce electricity, hydrogen, oxygen, pure water on-demand using a geothermal heat. In operation, a low voltage (such as less than 0.9V) is applied to a prepared solution having active catalysts (hydrogen generating substances) to generate hydrogen and oxygen. The hydrogen and oxygen are used to move a gas turbine to generate electricity. The oxygen and hydrogen are combusted to generate heat and pure water. This process is advantageous in many aspects including desalinating salt/sea water using a geothermal heat.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:
1. A method of desalination using geothermal heat comprising:
   a. performing a catalytic electrolysis reaction in a reaction vessel by applying a voltage to a solution containing sea water and a hydrogen generating catalyst, wherein the sea water contains an amount of sea salt, and wherein the hydrogen generating catalyst contains aluminum, copper, and silver;
   b. applying an electric voltage to the hydrogen generating catalyst between 0.4V to 0.9V for generating an amount of oxygen and an amount of hydrogen;
   c. combining the amount of oxygen and the amount of hydrogen together to drive an expansion turbine to generate an amount of electricity by using a gas pressure of the amount of hydrogen and the amount of oxygen;
   d. using the electricity for performing the catalytic electrolysis reaction;
   e. using the amount of hydrogen and the amount of oxygen generated at the electrolysis reaction as inter- mediate energy storage and generating an amount of pure water by combusting the amount of oxygen and the amount of hydrogen;

f. recycling an amount of recycled heat generated, by combusting the amount of hydrogen and the amount of oxygen, directly back to the reaction vessel containing the solution;

g. recycling the amount of pure water from a condenser back to the reaction vessel, wherein the pure water is separately recycled back to the reaction vessel from the amount of recycled heat;

h. combining the amount of recycled heat and an amount of heat from a geothermal heat as a heat source for the performing the catalytic electrolysis; and i. desalinating the sea water using the catalytic electrolysis of the sea water with the geothermal heat and the recycled heat to produce the amount of pure water, the amount of hydrogen, the amount of oxygen, or a combination thereof.

2. The method of claim 1, further comprising leaving the salt in the solution.

3. The method of claim 1, wherein the electric voltage is 0.85 V.

4. The method of claim 1, wherein the heat is collected using a heat exchanger.

5. The method of claim 1, wherein the solution is a non-acidic solution.

6. A desalination system comprising:

a. a hydrogen generating catalyst in a reaction vessel configured to convert water into hydrogen and oxygen when a voltage between 0.4V to 0.9V is applied, wherein the hydrogen generating catalyst comprises aluminum, copper, and silver, wherein the voltage is generated by an expansion turbine driven by using a gas pressure of the combined hydrogen and oxygen;

b. a combustion vessel for generating water vapor and heat of combustion by combusting the hydrogen and oxygen;

c. a condenser for condensing the water vapor into pure water;

d. a heat exchanger for collecting the heat of combustion; and e. a surface of the reaction vessel providing geothermal heat to the hydrogen generating catalyst, wherein the geothermal heat is combined with a recycled heat from the combusted hydrogen and oxygen to heat a reaction of a catalytic electrolysis, thereby a sea water is desalinated by using the catalytic electrolysis of the sea water with the geothermal heat and the recycled heat, wherein the pure water from the condenser is recycled back to the reaction vessel, wherein the pure water is separately recycled back to the reaction vessel from the recycled heat.

7. The system of claim 6, further comprising the expansion turbine fluidically connected between the reaction vessel and the combustion vessel.

8. The system of claim 6, further comprising a light source configured to regenerate the hydrogen generating catalyst.

9. The system of claim 6, further comprising a light source configured to generate a wavelength that reduces an oxidation state of silver oxide, copper oxide, or both, wherein the silver oxide and copper oxide are generated from the silver and the copper.

10. A method of storing an amount of energy comprising:

a. storing an amount of energy including an amount of geothermal heat, an amount of electricity, or both in a reaction vessel by converting an amount of water into hydrogen and oxygen;

b. generating the hydrogen and oxygen by applying a voltage between 0.4V to 0.9V, to a hydrogen generating catalyst in a solution containing aluminum, copper, and silver, wherein the voltage is generated by an expansion turbine driven by the hydrogen and the oxygen through using a gas pressure of the hydrogen and oxygen;

c. transporting the hydrogen and oxygen away from the reaction vessel;

d. releasing the amount of energy by combusting the hydrogen and oxygen; and e. providing the amount of geothermal heat to the solution, wherein the geothermal heat is combined with a recycled heat from the combustion reaction of the hydrogen and the oxygen to heat a reaction of the hydrogen and the oxygen generation, thereby the amount of water in the solution is decomposed by using a catalytic electrolysis with the geothermal heat and the recycled heat, wherein an amount of pure water from a condenser is recycled back to the solution, wherein the pure water is separately recycled back to the solution from the recycled heat.

* * * * *